(12) United States Patent
Hart et al.

(10) Patent No.: US 9,823,330 B2
(45) Date of Patent: Nov. 21, 2017

(54) ANGLE OF ARRIVAL LOCATION SENSING WITH ANTENNA ARRAY

(71) Applicant: CISCO TECHNOLOGY, INC., San Jose, CA (US)

(72) Inventors: Brian Donald Hart, Sunnyvale, CA (US); Paul J. Stager, Akron, OH (US); Santosh Pandey, Santa Clara, CA (US); David Kloper, Santa Clara, CA (US); Dan Lyons, Medina, OH (US); Matthew A. Silverman, Shaker Heights, OH (US)

(73) Assignee: Cisco Technology, Inc., San Jose, CA (US)

( * ) Notice: Subject to any disclaimer, the term of this patent is extended or adjusted under 35 U.S.C. 154(b) by 869 days.

(21) Appl. No.: 13/886,533

(22) Filed: May 3, 2013

(65) Prior Publication Data

US 2014/0327579 A1    Nov. 6, 2014

(51) Int. Cl.
| | |
|---|---|
| *G01S 3/38* | (2006.01) |
| *G01S 3/48* | (2006.01) |
| *H04W 64/00* | (2009.01) |
| *G01S 1/68* | (2006.01) |

(52) U.S. Cl.
CPC ............ *G01S 3/38* (2013.01); *G01S 3/48* (2013.01); *H04W 64/006* (2013.01); *G01S 1/68* (2013.01)

(58) Field of Classification Search
CPC .... G01S 3/38; G01S 3/48; G01S 1/68; H04W 64/006

USPC .......................................................... 342/374
See application file for complete search history.

(56) References Cited

U.S. PATENT DOCUMENTS

| | | | |
|---|---|---|---|
| 2007/0025245 A1* | 2/2007 | Porras | H04W 99/00 370/229 |
| 2008/0080429 A1 | 4/2008 | Hart | |
| 2008/0084858 A1 | 4/2008 | Douglas et al. | |
| 2010/0271228 A1 | 10/2010 | Hart et al. | |
| 2010/0271263 A1* | 10/2010 | Moshfeghi | G01S 5/0263 342/378 |
| 2011/0009071 A1 | 1/2011 | Stager et al. | |
| 2013/0088395 A1* | 4/2013 | Vaarakangas | G01S 3/48 342/378 |

OTHER PUBLICATIONS

Preliminary Examination Report on PCT/US14/35343 dated Nov. 3, 2015.*

* cited by examiner

*Primary Examiner* — Frank J McGue
(74) *Attorney, Agent, or Firm* — Cindy Kaplan

(57) ABSTRACT

In one embodiment, an apparatus includes a plurality of antennas, a receiver in communication with said plurality of antennas for receiving one or more packets in a block based modulation environment, a switch interposed between a portion of the antennas and the receiver for switching between the antennas, and a processor for calculating angle of arrival for use in identifying a location of a mobile device transmitting the one or more packets.

20 Claims, 13 Drawing Sheets

ANGLE OF ARRIVAL LOCATION SENSING WITH ANTENNA ARRAY

TECHNICAL FIELD

The present disclosure relates generally to communication systems, and more particularly, to wireless communication systems.

BACKGROUND

The demand for location based services continues to increase. There are many techniques for determining the position of a device using radio signals. Technologies such as Global Positioning Systems (GPS) are often used in outdoor environments. Indoor location sensing presents different problems than outdoor positioning. Conventional techniques have difficulty accurately calculating indoor locations in high ceiling areas or multi-story areas comprising open atriums, stairways, or escalators.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
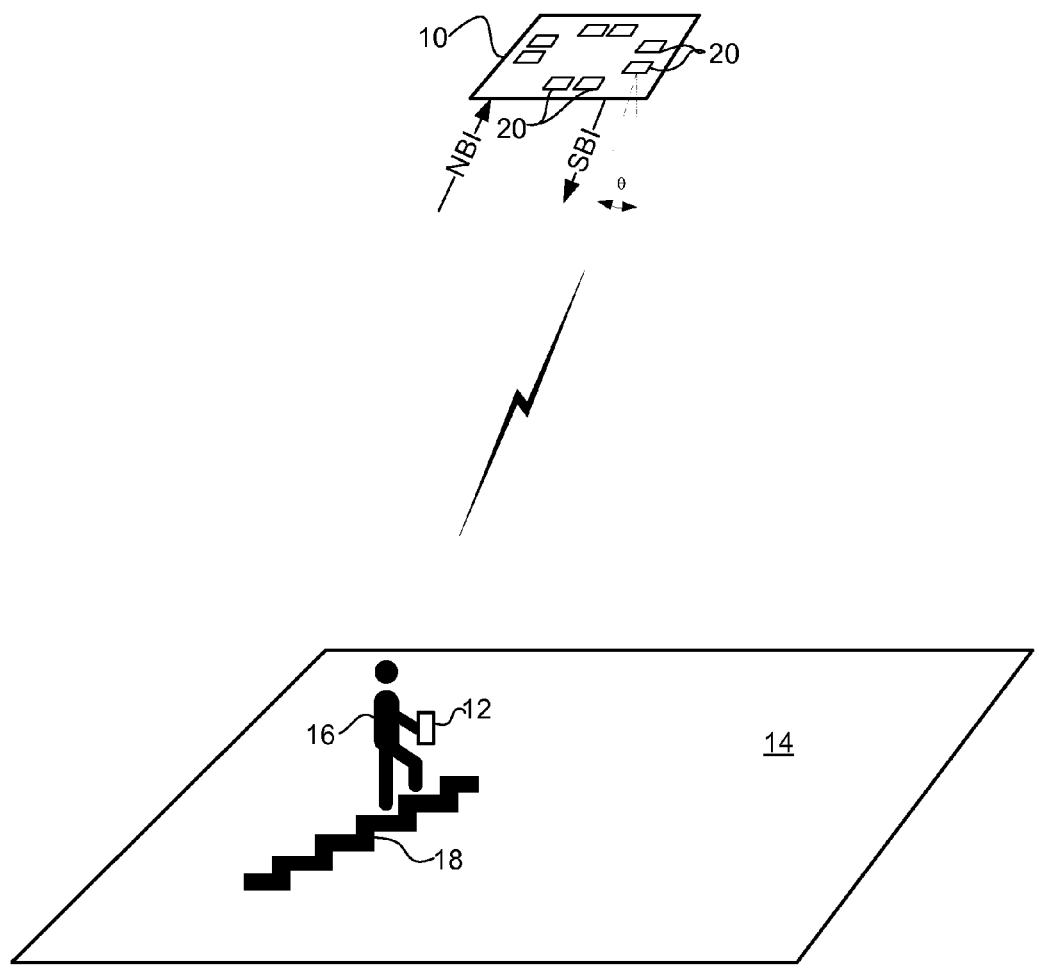
FIG. 1 illustrates an example of an environment in which embodiments described herein may be implemented.

In one embodiment, an apparatus generally comprises a plurality of antennas, a receiver in communication with said plurality of antennas for receiving one or more packets in a block based modulation environment, a switch interposed between a portion of the antennas and the receiver for switching between the antennas, and a processor for calculating angle of arrival for use in identifying a location of a mobile device transmitting the one or more packets.

In another embodiment, an apparatus generally comprises a plurality of antennas, a transmitter in communication with the antennas for transmitting one or more packets in a block based modulation environment to a mobile device for use in calculating angle of arrival for location sensing at the mobile device, and a switch interposed between the transmitter and at least two of the antennas for switching between the antennas. The transmitter is configured for transmitting an aggregate media access control protocol data unit (MPDU) comprising metadata in at least one MPDU followed by at least one other MPDU. The switching is performed during transmittal of the other MPDU.

In yet another embodiment, a method generally comprises receiving a plurality of radio frequency chains at a wireless device in a block based modulation environment, recording subcarrier phases and differences between the subcarrier phases, and using the subcarrier phase differences to construct a feature vector for use in angle of arrival calculated positioning of a mobile device.

In another embodiment, an apparatus generally comprises a first access point comprising a plurality of antennas, and one or more other access points each comprising a plurality of antennas. At least one antenna from each of the access points is coupled with one of the antennas from another of the access points such that all of said plurality of access points are connected to enable sharing of information between the access points for use in location sensing.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Angle of arrival (AoA) style accuracy is important in indoor applications such as high ceiling deployments using Wi-Fi located in the ceiling of a building or facing horizontally across an open atrium (for inter-floor resolution), for example. The embodiments described herein provide indoor positioning information using angle of arrival (AoA). In one embodiment, angle of arrival calculations are performed in parallel with communications in the network. The embodiments may use 2D or 3D antenna configurations for estimation of the angle of arrival at an access point (AP), for example. The embodiments may also be used to provide indoor positioning client calculated angle of arrival.

As described in detail below, infrastructure (AP) calculated AoA may be implemented with existing hardware using additional packets per client (or reduced accuracy), or with new hardware that provides better accuracy from a single packet. Location sensing can be performed on any Wi-Fi type packet. This is helpful for the infrastructure calculated embodiment since even with a mostly quiet wireless device, an application on the device can usually cause packets to be sent on the Wi-Fi interface, and thereby enable an AP calculated location determination. Client calculated AoA may be implemented via existing hardware with more packets transmitted for clients (or reduced accuracy), or via new hardware with better accuracy from a single packet.

Referring now to the drawings, and first to FIG. 1, an example of a wireless network in which embodiments described herein may be implemented is shown. FIG. 1 illustrates an access point (AP) 10 in communication with a mobile device (client, wireless device, user device) 12 located at a position in a building (e.g., shopping center, retail store (grocery, hardware, department, etc.), warehouse, convention center, conference center, sports arena, stadium, and the like). The building may include any number of floors, stairways, escalators, open atriums, etc. In the example shown in FIG. 1, the mobile device 12 is carried by a user 16 located on a stairway 18 in the building. For simplification, only one floor 14 is shown. The example of FIG. 1 shows only one mobile device 12, however, the access point 10 may be in communication with any number of mobile devices 12. Also, there may be more than one access point 10.

The AP 10 may include any number of antennas 20 (also referred to as antenna elements or antenna array). As described below, the AP 10 includes a transmitter and receiver (or transceiver). The receiver at the AP 10 may be used to identify a location of the mobile device 12 based on signals received from the mobile device. The transmitter at the AP 10 may be used to transmit signals to the mobile device 12 to enable the mobile device to identify its location. The AP 10 may also be in communication with a wired network (not shown). The AP 10 may be used to provide wireless Internet access to the mobile device 12 via a WLAN (wireless local area network), for example.

The mobile device 12 may be any suitable equipment that supports wireless communication, including for example, a mobile phone, wireless VoIP phone, Personal Digital Assistant (PDA), laptop computer, tablet, multimedia device, or any other device capable of operating in a wireless environment. The mobile device 12 may have one or more antennas.

The AP 10 may be a MIMO (multiple-input multiple-output) device. In one embodiment, the AP 10 is configured to simultaneously transmit from its antennas 20 multiple signal streams, also referred to as spatial streams, to the mobile device 12. The AP 10 is configured for block based modulation (e.g., OFDM (Orthogonal Frequency Division Multiplexing), OFDMA (Orthogonal Frequency Division Multiplexing Access)) or other multicarrier modulation method. The term 'block based modulation' as used herein refers to operations performed in a Wi-Fi type environment (i.e., not Bluetooth technologies). The access point 10 and mobile device 12 may be configured to perform wireless communication according to a wireless network communication protocol such as IEEE 802.11/Wi-Fi, IEEE 802.16/WiMAX, or other suitable protocol.

In the embodiments described herein, transmissions from the client 12 to the AP 10 are referred to as uplink transmissions (received at northbound interface (NBI) at AP) and transmissions from the AP to the client are referred to as downlink transmissions (transmitted from southbound interface (SBI) at AP). In a first embodiment, the northbound interface is used for infrastructure (AP) calculated location using angle of arrival. In a second embodiment, the southbound interface is used for client calculated location using angle of arrival.

The angle of arrival is used at the AP 10 to locate the mobile device 12 by determining the angle of incidence at which signals arrive at the receiving sensors (antennas 20). The client 12 transmits a payload with metadata (e.g., client identity) followed by a waveform. Using the signal that is received at the multiple antenna array, the AoA (also referred to as direction of arrival (DoA)) of the mobile device 12 at the AP 10 can be estimated from the properties of the wireless channel. Geometric relationships can be used to estimate location from the intersection of two lines of bearing formed by a radial line to each antenna 20. For example, the AoA may be defined as an angle between the propagation direction of an incident wave and some reference direction (e.g., angle $\theta$ in FIG. 1). As described below, electronic switching can be performed between antennas and mathematical computations handled by a background computing system used to extract the angles of incidence.

In one embodiment, TDoA (Time Difference of Arrival), which uses relative time measurements at each receiving sensor, is calculated between elements of the array by measuring the difference in received phase at each element. AoA determines the direction by measuring the TDoA at individual elements of the array. These delays are used to calculate the AoA. The TDoA measurement may be made by measuring the difference in received phase at each element in the antenna array. For example, the nearer antenna receives the signal first and the farther antenna receives the signal last. Time translates to distance via the speed of light and the distance modulo the wavelength is measureable as carrier phase.

In one example at the northbound interface, the AP 10 switches through a portion of its antenna array and gets a vector of phases (one per switched antenna). Depending on the xy location of the client 12 under the AP, the vector of phases changes. This may be referred to as a feature vector (also referred to as a signature or fingerprint). If the antennas 20 are sufficiently closely spaced, the feature vector is similar to feature vectors at immediately adjacent xy locations but very different from feature vectors further away.

For the southbound interface, the AP 10 transmits a packet comprising a payload (AP identity, etc.) followed by known junk (e.g., zero delimiter or other non-usable data). In one example, the AP 10 switches through its antennas 20 and the client 12 records a vector of phases. The client 12 also receives assistance data (e.g., AP position, antenna array and geometry, etc.) and computes its own location.

In one embodiment, a two-dimensional (2D) or three-dimensional (3D) antenna array is used to measure a distinctive phase feature vector for different locations below the AP 10. The AP 10 may also contain a planar array of antenna elements 20. The AP 10 may be mounted on the ceiling or other location in the building such as a wall (e.g., AP mounted on its side pointing across atrium so that the AP can measure height). In one example, switched patch antennas are located around the AP edge. The 2D antenna array may include, for example, outer and inner rings of antenna elements, with one ring nearer the ceiling and the other ring nearer the floor.

It is to be understood that the environment shown in FIG. 1 and described above is only an example and that the embodiments described herein may be implemented in environments having different configurations, network devices, or network topologies. For example, as previously noted, the access point 10 may be in communication with any number of clients 12 and more than one AP may be used. Also, the AP 10 and antenna array may be different than described herein, without departing from the scope of the embodiments.

Figure 2:
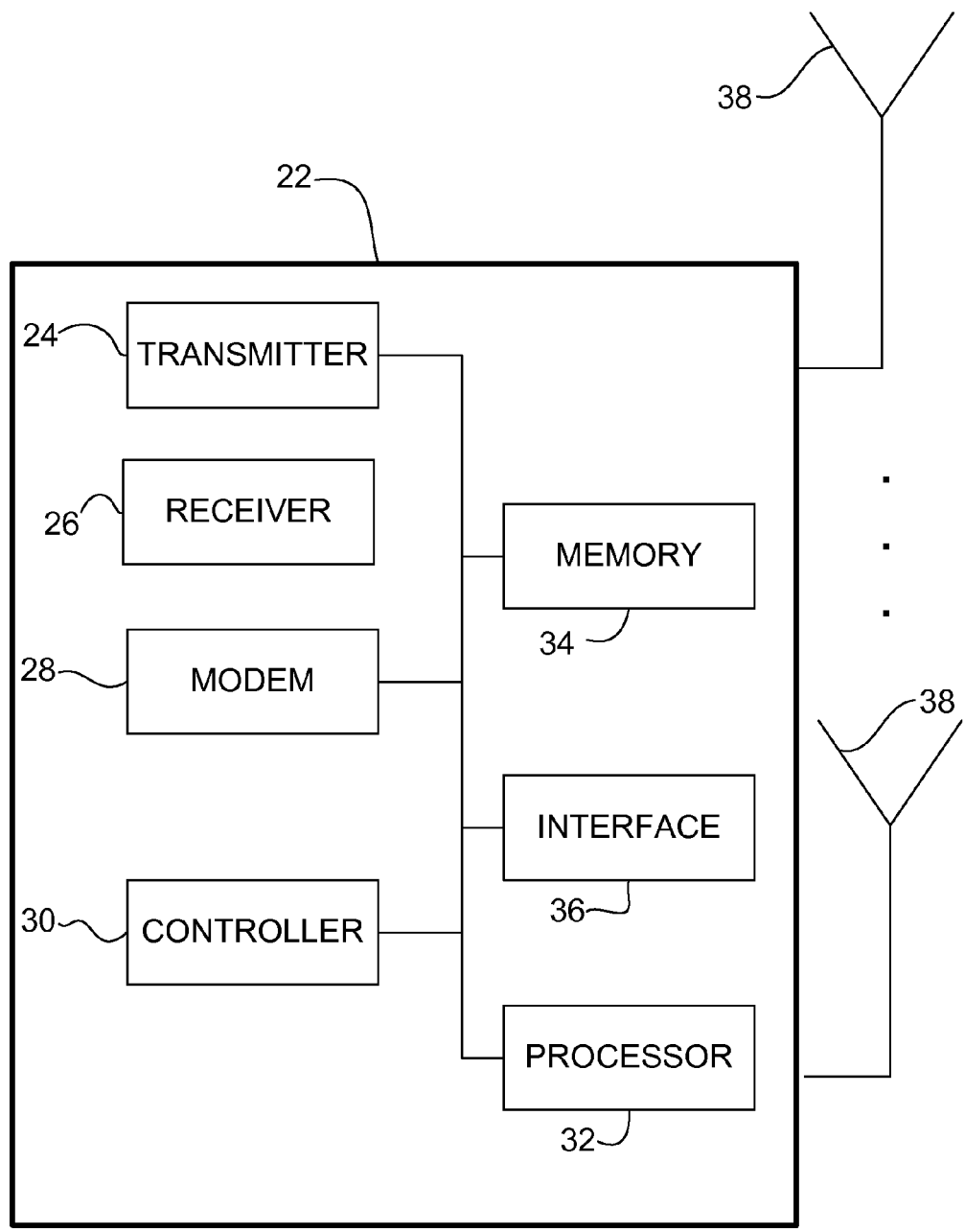
FIG. 2 depicts an example of a network device useful in implementing embodiments described herein.

FIG. 2 is a block diagram illustrating an example of a wireless network device 22 (e.g., access point) that may be used to implement embodiments described herein. In one embodiment, the network device 22 is a programmable machine that may be implemented in hardware, software, or any combination thereof. The device 22 includes a transmitter 24, receiver 26, modem 28, controller 30, processor 32, memory 34, and interface 36. The terms transmitter and receiver as used herein may also refer to a transceiver.

The modem 28 is configured to implement modulation and framing of signals according to the applicable communication protocol or standard (e.g., IEEE 802.11) under control of the controller 30. The modem 28 receives as input, the output of RF (radio frequency) receivers from the receiver 26. Analog-to-digital converters (ADCs) may reside between the outputs of the RF receivers and the modem, within the modem, or within the RF receivers. The modem 28 demodulates signals from the receivers and modulates transmit signals for transmission. The output of the modem 28 is coupled to RF transmitters at the transmitter 24. The transmitters are coupled to a plurality of antennas 38 (e.g., 4, 8, 16, 32 antennas). Digital to analog converters (DACs) may be provided between the digital output of the modulator and the analog input to the transmitters.

The controller 30 includes logic to implement embodiments described herein from the perspective of the AP 10 or client device 12. The logic may be encoded in one or more tangible media (memory 34) for execution by the processor 32. For example, the processor 32 may execute codes stored in a computer-readable medium such as memory 34. The logic may be in the form of software executed by the processor, digital signal processor instructions, or in the form of fixed logic in an integrated circuit, for example.

Memory 34 may be a volatile memory or non-volatile storage, which stores various applications, operating systems, modules, and data for execution and use by the processor 32. Memory 34 may include multiple memory components.

The interface 36 may include any number of wireless or wired interfaces. For example, the AP 10 may include a network interface for communication with a LAN.

It is to be understood that the network device 22 shown in FIG. 2 and described above is only an example and that different configurations of network devices may be used. For example, the network device 22 may further include any suitable combination of hardware, software, algorithms, processors, devices, components, or elements operable to facilitate the capabilities described herein. One or more components shown in the block diagram of FIG. 2 may be implemented on a chip or chipset.

Referring again to FIG. 1, a first embodiment described herein is performed at the northbound interface at the AP 10 to provide infrastructure (AP) calculated AoA for use in identifying mobile device location. A second embodiment is performed at the southbound interface at the AP 10 for use in enabling client calculated AoA. Within each embodiment, there are a number of possible variations. For example, each embodiment includes an intra-packet switched method, an intra-packet or inter-packet parallel method, and an intra+inter-packet switched+parallel method. An inter-packet switched method is also provided for the northbound interface. For the northbound interface embodiment, the switched methods include a frequency domain implementation and a time domain implementation.

The term 'intra' as used herein refers to operations (e.g., antenna cycling) performed within a packet and the term 'inter' refers to operations performed between packets (or groups of packets). For example, with intra-packet switching, the switching may be performed on every other OFDM symbol (e.g., odd OFDM symbols) within a packet. With inter-packet switching, the antennas are switched between packets (e.g., before every receive (RX) packet or immediately after a packet). As described below, a combination of inter-packet and intra-packet may also be used. The terms intra-packet and inter-packet as used herein may refer to intra-PPDU and inter-PPDU, respectively, as described below.

The term 'packet' as used herein may refer to a PDU (Protocol Data Unit) or other unit structure contained within a signal received at the AP 10 from the mobile device 12 (or transmitted from the AP to the mobile device). In one embodiment, the PDU (packet) is a PLCP (Physical Layer Convergence Protocol) PDU (PPDU). PLCP takes each IEEE 802.11 frame that a station wishes to transmit and forms what is referred to as a PLCP protocol data unit (PPDU). The term 'packet' as used herein may refer to any type of protocol data unit, including PPDU.

The PPDU includes a PLCP preamble, PLCP header, and data (PSDU (PLCP Service Data unit)). PLCP appends the PHY-specific preamble and header fields to an MPDU (MAC (Media Access Control) Protocol Data Unit) that contains information needed by the physical layer transmitters and receivers. The MAC layer refers to the data that it passes to the Physical layer as the MPDU, while the Physical layer refers to it as the PSDU. A PPDU is created by adding the preamble and header to the MPDU.

Figure 3A:
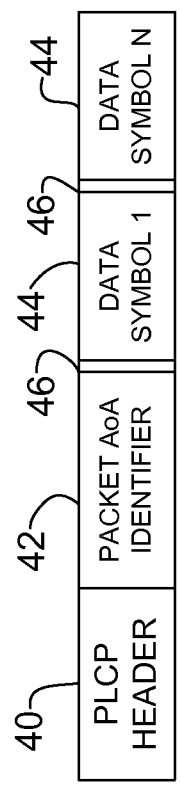
FIG. 3A is a diagram of a PLCP packet data structure for use in location sensing, in accordance with one embodiment.

FIG. 3A illustrates a first example of a format for the PPDU. The packet includes a PLCP header (preamble and header) 40, an AoA packet identifier frame 42 and a variable number (1 . . . N) of data subframes (e.g., OFDM symbols) 44. The data subframes are separated by a gap 46 (e.g., OFDM symbols separated by a guard interval to reduce inter-symbol interference). The AoA packet identifier 42 indicates that the packet is a special AoA packet used for AoA location sensing.

Figure 3B:
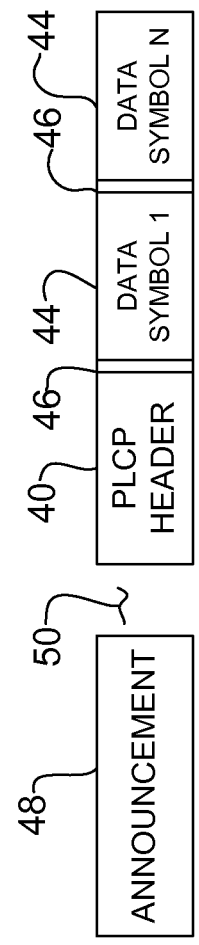
FIG. 3B is a diagram of a PLCP packet data structure for use in location sensing, in accordance with another embodiment.

FIG. 3B illustrates an alternate implementation in which the AoA packet identifier frame 42 is replaced with an announcement frame 48 followed by an SIFS (Short Interframe Space) 50. The PLCP header 40 and data subframes 44 follow the SIFS. As noted above, there may be gaps 46 between data subframes 44.

It is to be understood that the data structures shown in FIGS. 3A and 3B are only examples and that other formats may be used without departing from the scope of the embodiments.

Figure 4A:
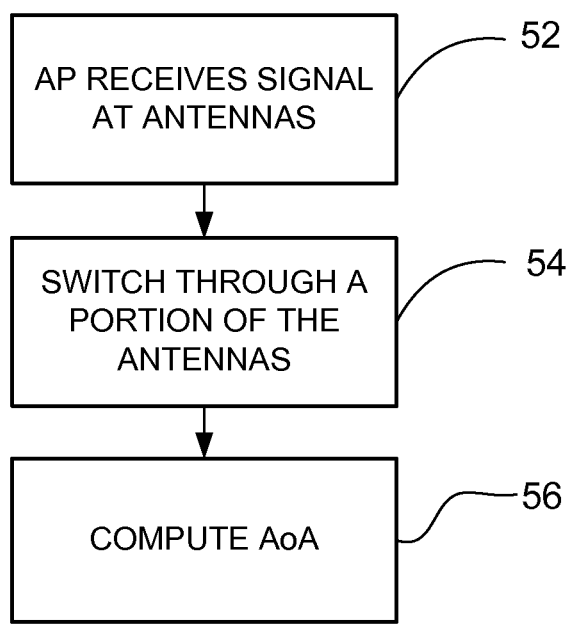
FIG. 4A is a flowchart illustrating an overview of a process for location sensing using access point calculated angle of arrival with a switched method, in accordance with one embodiment.
Figure 4B:
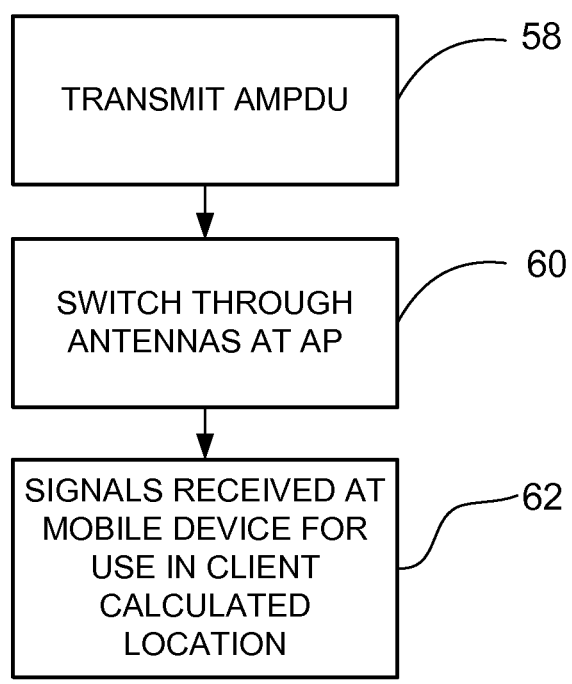
FIG. 4B is a flowchart illustrating an overview of a process for use in location sensing using client calculated angle of arrival with a switched method, in accordance with one embodiment.
Figure 4C:
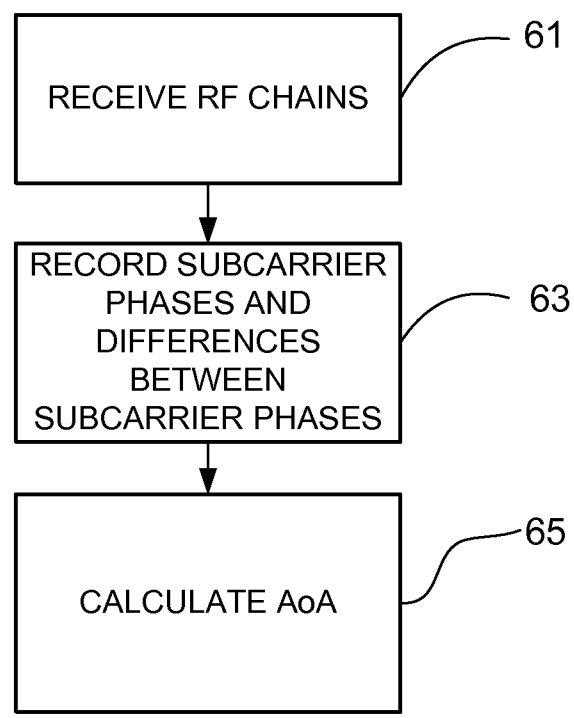
FIG. 4C is a flowchart illustrating an overview of a process for angle of arrival calculations with a parallel method, in accordance with one embodiment.

FIGS. 4A-4C are flowcharts illustrating an overview of the different processes that may be used for AoA location sensing. FIG. 4A describes a switched method performed at the northbound interface of the AP for AP calculated angle of arrival. FIG. 4B describes a switched method performed at the southbound interface of the AP to enable client calculated angle of arrival. FIG. 4C provides an overview of a parallel method for use in AP or client calculated angle of arrival. Details of each of these processes and variations thereof are described below.

Referring first to FIG. 4A, an overview of a process for AoA location sensing at the AP 10 in accordance with one embodiment is shown. At step 52, the AP 10 receives from the mobile device 12, one or more signals at antennas 20

(FIGS. 1 and 4A). As previously described, the AP 10 comprises a receiver in communication with the antennas 20 for receiving one or more packets (e.g., PPDUs) in a block based modulation environment (e.g., OFDM or other modulation method for use in a system configured for Wi-Fi type communication). The AP 10 comprises one or more switches for cycling a portion of the antennas 20 (step 54). The AP 10 includes a processor for calculating an angle of arrival for use in identifying a location of the mobile device 12 transmitting the packets (step 56). Communications and location sensing are provided by the same packet so that positioning can occur in parallel with Wi-Fi communications, thereby taking advantage of the MIMO abilities of the AP. As described below intra-packet switching or inter-packet switching may be performed. The signals are processed using a frequency domain or time domain technique (described in detail below), to identify a location of the mobile device 12 based on angle of arrival calculations.

FIG. 4B is a flowchart illustrating an overview of a process for enabling AoA location sensing at the mobile device 12, in accordance with one embodiment. The transmitter is configured for transmitting an AMPDU (Aggregate MAC Protocol Data Unit) comprising metadata in one or more of the MPDUs followed by one or more other MPDUs (e.g., junk MPDUs). The transmitter transmits a packet and the switch switches through antennas (steps 58 and 60). As described below, the transmit antenna switches during select MPDUs. The client 12 uses the received signals from the AP 10 to calculate its location based on AoA (step 62).

The flowchart of FIG. 4C illustrates an overview of a parallel method for use in location sensing, in accordance with one embodiment. At step 61, the wireless device (e.g., AP 10, mobile device 12) receives RF chains. The wireless device records subcarrier phases and differences between subcarrier phases (step 63) and calculates AoA (step 65).

It is to be understood that the processes shown in FIGS. 4A, 4B, and 4C and described above, are only examples and that steps may be added, combined, or modified, without departing from the scope of the embodiments.

Examples of implementation details for the northbound interface embodiment are described first below, with details for the intra, inter, switched, and parallel combinations, followed by the southbound interface embodiment, with details for the intra, inter, switched, and parallel combinations for the second embodiment. Following the discussion of these two embodiments is a description of an AP interface, and an AP structure (referred to as a daisy chain implementation) that may be used on its own or in combination with any of the above embodiments.

Northbound Interface

The following describes the first embodiment for AP (infrastructure) calculated AoA at the northbound interface of the AP 10.

Intra-Packet Switched

Figure 5:
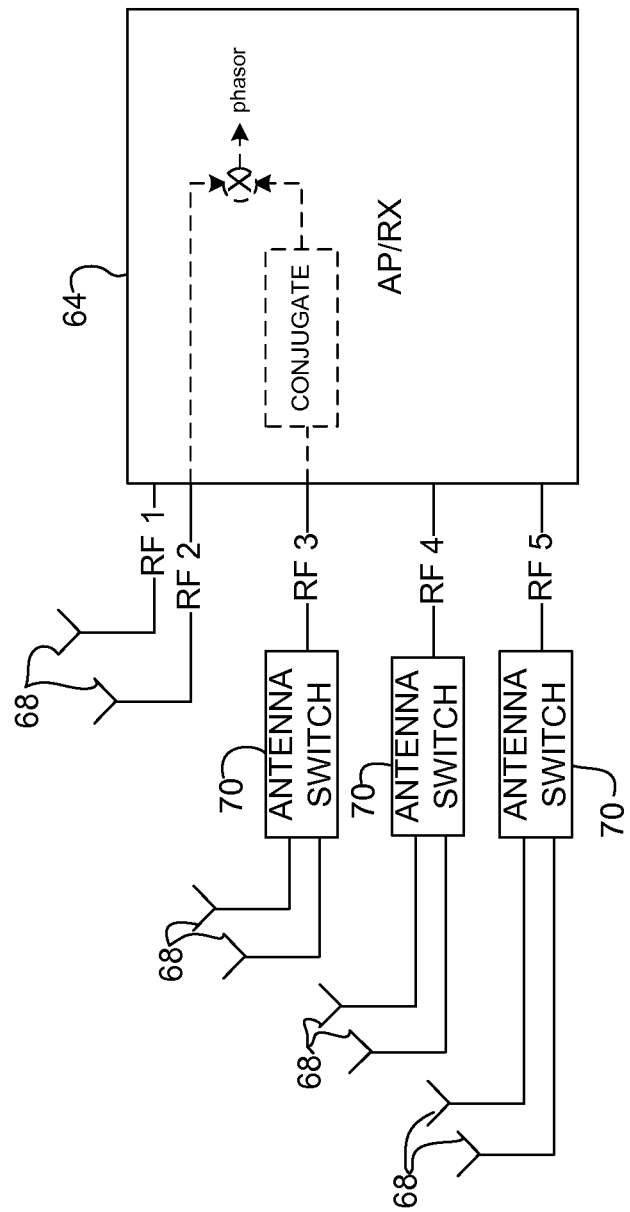
FIG. 5 is a block diagram of an access point for use in a switched method for location sensing, in accordance with one embodiment.

Referring now to FIG. 5, a receiver 64 is shown for use in receiving packets at the northbound interface of the AR The AP shown in this example includes eight antennas (antenna elements) 68. There are two antennas used for communication (M1=2 (two RF chains)) and six antennas used for location sensing (three RF chains, each connected to an antenna switch 70) (M2=3). Each switch 70 is coupled to two antennas 68. The AP has M1 assigned to communication and M2 assigned to location receive (RX) RF chains, where M1 RF chains are directly connected to antennas 68 and are used to receive all packets (PPDUs). This arrangement allows for communication and location sensing to occur on the same packet (PPDU), with the location measurement being associated with the client's MAC (Media Access Control) address. In one embodiment, the antennas used for communication comprise a dipole array and the antennas used for location sensing comprise a conformal array.

It is to be understood that the arrangement shown in FIG. 5 is only an example, and that the receiver 64 may be in communication with any number of antenna elements. Also, M1 and M2 may have values other than shown (e.g., 1, 2, 3 . . . ). For M2, for example, there may be 4, 8, 16, or 32 antenna elements per RX RF chain connected to a 4×1, 8×1, 16×1, or 32×1 (i.e., N-way) RF switch 70 under control of the radio's baseband. Also, there may be any number of switches 70 (e.g., 1, 2, 3 . . .). For example, a 4×4:3 (4 antennas, 3 data streams) AP may have M1=3 and M2=1. This allows for communications for PPDUs up to three spatial streams (SS) and also provides location information.

The PPDU includes a Legacy Long Training Field (L-LTF) (IEEE 802.11a) or (Very) High Throughput LTFs ((V)HT-LTFs) (IEEE 802.11n/ac). After receiving the LTF or (V)HT-LTFs, the baseband commands the M2 RF switch (or switches) 70 and the switch cycles through the antenna elements 68. The switching may be synced with the OFDM symbols of the received signal so that the switching is on odd OFDM symbols. This means that all of the even symbols are captured pristinely (no antenna switching in the middle) so that their subcarriers are orthogonal after an FFT (Fast Fourier Transform).

In an alternate embodiment, rather than switching during the odd OFDM symbols, the AP 10 may switch during the cyclic extensions. This provides twice as long a feature vector in the same time, but does make the system more sensitive to timing recovery, multipath, and filter transients.

The intra-PPDU switched method may be performed using a frequency domain implementation or a time domain implementation, as described below.

Figure 6:
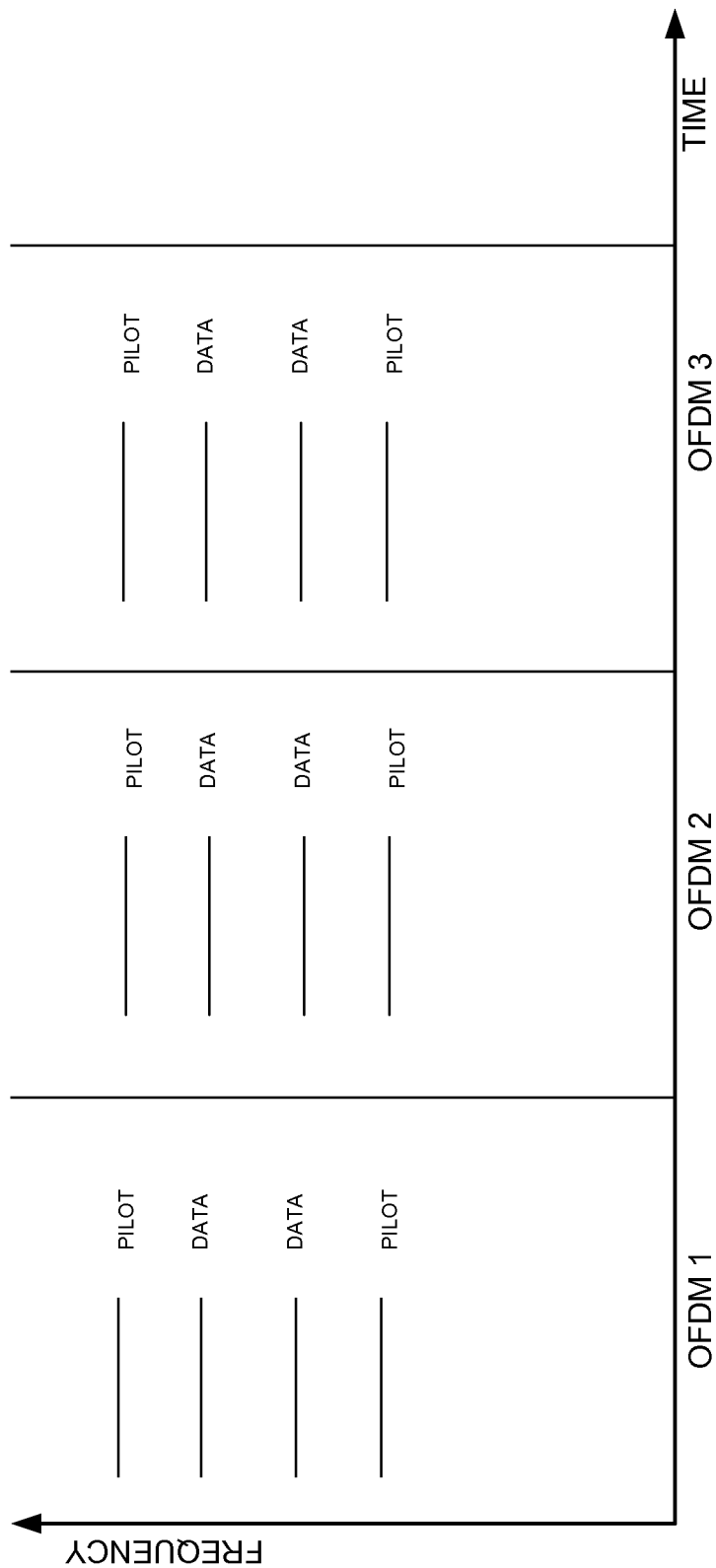
FIG. 6 is a frequency domain graph for use in location sensing, in accordance with one embodiment.

FIG. 6 is a graph illustrating an example of OFDM structure. In the frequency domain, a channel is made up of groups of adjacent subcarriers each modulated with a mix of data and pilot subcarriers over OFDM symbols. The graph shown is only an example, and each symbol may have a different pilot sequence. In the frequency domain implementation, the AP's RX baseband removes the carrier frequency offset (measured during the preamble and tracked by the M1 antennas or the even symbols received on the M2 antennas), then performs an FFT and for simplification records only the IQ (Inphase Quadrature) samples of the pilot tones at the even symbols. This avoids having to demodulate the data tones or decode the data and re-encode+remodulate it. The AP removes the known pilot modulation and averages the pilots (in the in-phase or quadrature (IQ) domain or phase domain or phase-weighted-by-amplitude domain) across the frequency domain. This yields a vector of phases at the switched antennas (i.e., the feature vector).

The time domain implementation is illustrated by dashed lines in FIG. 5. (For simplification the operation is shown for only one of the RF chains.) In order to avoid the need to remove the pilot (or data) modulation, pairwise multiplying is used. The subcarrier IQ value from each of the M1 RF chains is pairwise multiplied with a complex conjugated version of the same subcarrier IQ value from one of the M2 antennas. The phase changes of the product reflect the phase changes arising from antenna switching. This works for pilot and data subcarriers for a 1SS (one spatial stream) PPDU. It also works for an IEEE 802.11ac PPDU with any number of spatial streams.

The processor is thus configured for pairwise multiplying a value from one of the antennas used for communications with a complex conjugated version of the value from one of the antennas used for location sensing. The value may be, for example, a subcarrier value or raw time-domain IQ samples.

For IEEE 802.11n PPDUs, each spatial stream has a different pilot sequence, therefore it is easiest to apply the above techniques to 1SS PPDUs (e.g., send a 1SS frame to elicit a 1SS response). A Block Ack Request may be sent regardless of the presence or absence of Block Ack agreements to elicit a Block Ack, since a Block Ack, unlike an Ack, includes a transmitter address.

If the PPDU is too short (e.g., 32 antenna elements*2 OFDM symbols is longer than many PPDUs), the Intra+Inter-PPDU parallel method (described below) may be used.

As well as serving AP switching antennas, nearby APs can also perform this antenna switching and contribute additional AoA info) cation. The two APs may communicate directly or through a controller. These nearby APs may be far enough away that they cannot correctly decode the PSDU (PLCP Service Data Unit) (payload bits received at PHY from MAC) and so obtain a transmitter address. However, the pilots are still Binary Phase Shift Keying (BPSK) modulated and, by recording a timestamp, a central entity (controller or mobility services engine (MSE)) can correlate, via the timestamps, the nearby APs' measurements with a correctly decoded measurement (e.g., from the serving AP) and use all of the AoA information across all APs. The AP timestamp counters should be aligned. There are various ways to achieve this. For example IEEE 1588 and on-AP correction may be used. Another option is post processing of timestamps of uniquely identifiable frames decoded by multiple APs (beacons with their continuously incrementing TSF (Timing Synchronization Function)/timestamp field may be used for a uniquely identifiable frame).

An example for using information from multiple APs is also described below with respect to FIGS. 10 and 11.

Intra-Packet Parallel

Figure 7:
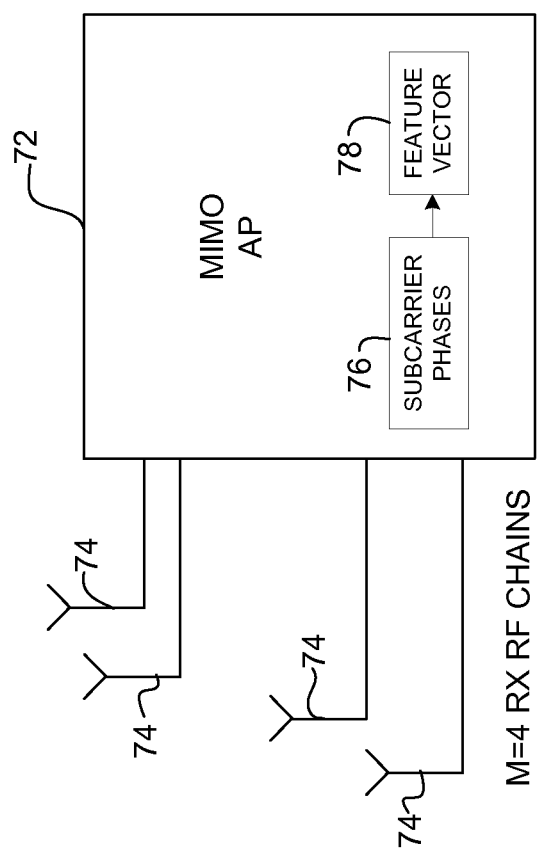
FIG. 7 is a block diagram of an access point for use in a parallel method for location sensing, in accordance with one embodiment.

FIG. 7 illustrates an example of an AP 72 for use in an intra-PPDU parallel implementation for the northbound interface. This implementation uses a MIMO (Multiple-Input Multiple-Output) AP with M RX RF chains and no antenna switches. In the example shown in FIG. 7, M=4, however, any number of antennas 74 may be used. The data is decoded as usual, but the subcarrier phases 76 are also recorded. The subcarrier phases may be recorded, for example, during the L-LTFs or (V)HT-LTFs. This provides a lot of frequency domain averaging and yields a length-M feature vector 78. M may be, for example, 4, 8, 16, or 32.

Inter-Packet Switched

The following describes an inter-PPDU switched method, which may be performed using the receiver shown in FIG. 5, for example. In this implementation, there are M1 RF chains (direct to antennas) plus M2 RF chains with N-way RF switches (N*M2 antennas). M1 may be equal to one or may be greater than one. Before every RX PPDU (or immediately after a PPDU), each of the M2 N-way RF switches are pseudo-randomly changed to a new antenna and there is no antenna switching during the PPDU. Communications proceed as usual on M1+M2 RF chains, although the beamforming coefficients are associated with an RF switch position. Pilots are received and processed as described above, preferably using the complex-conjugate multiplication method (time domain implementation) with respect to one or more of the M1 reference RF chains. Since the M1 reference RF chains do not switch, the phase of the IQ products are stable across multiple PPDUs. Therefore, the feature vector comprises min(M2*N, M2+M2+M2, . . . )=min(M2*N, M2*Npkt) entries. Npckt is the number of PPDUs received from a single client in a time window during which the multipath should have little change.

Intra+Inter-Packet Switched+Parallel

As noted above, the intra-PPDU and inter-PPDU methods may be combined (FIGS. 5 and 7). In this implementation, the M2 switched antennas are referenced to one or more of the M1 stable antennas (unswitched across PPDUs) via a complex-conjugate multiplication so that phases can be measured to construct a feature vector across multiple PPDUs. The M2 RF chains also perform intra-PPDU switching. For example, the AP may be a 4×4:3 with M1=3 unswitched RF chains and M2=1 switched RF chain, and a 16×1 switch. If the AP receives a 12 data OFDM symbol PPDU (6 phases), then receives an 8 data OFDM symbol PPDU (4 phases), and then receives a 12 data OFDM symbol PPDU (6 phases) from the same client, the AP will have the full feature vector.

Southbound Interface

The following describes the southbound interface embodiments, which include intra-packet switched, inter-packet parallel, and intra+inter-packet switched+parallel. As previously discussed, this embodiment enables client calculated angle of arrival for use in identifying the location of the mobile device at the mobile device.

Intra-Packet Switched

Figure 8:
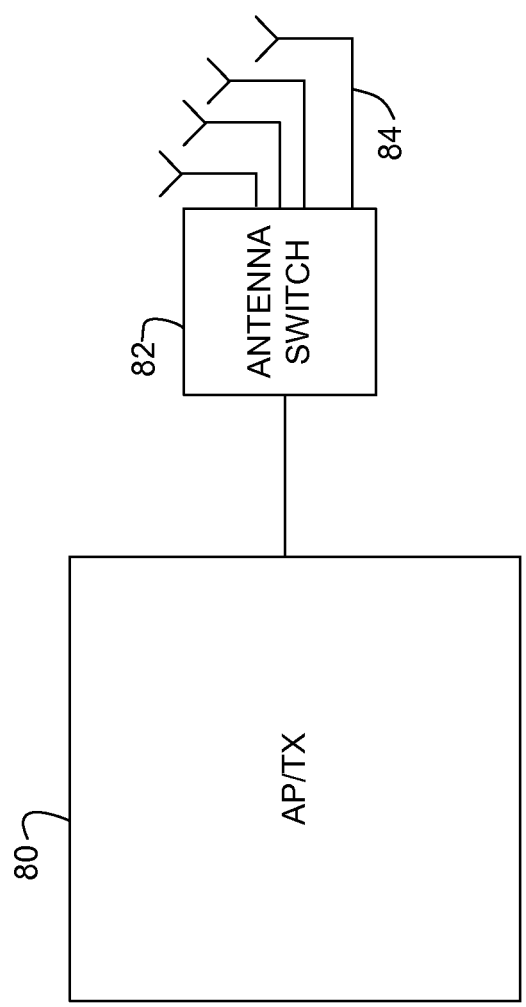
FIG. 8 is a block diagram of a transmitter for transmitting signals from an access point for use in location sensing at a mobile device, in accordance with one embodiment.

FIG. 8 illustrates an example of a transmitter 80 for use at the southbound interface. The transmitter has an RF chain and a 4-way switch 82. It is to be understood that this is only an example and the AP may have any number of RF chains (e.g., 1, 2, 3 . . . ) connected to one or more N-way RF switches connected to any number of antennas (e.g., 4, 8, 16, 32). The AP 80 broadcasts a 1SS aggregate MAC protocol Data Unit (Aggregate MPDU or AMPDU) comprising metadata in one or more MPDUs. The metadata may include, for example, AP MAC address, AP latitude/longitude/altitude/floor level, antenna sequence (e.g., list of antenna indices), antenna array geometry, or any combination thereof. The metadata MPDU (or MPDUs) are followed by one or more other MPDUs (referred to as junk MPDUs). The junk MPDUs may have, for example, a zero delimiter. The transmitting antenna switching occurs only during the junk MPDUs (e.g., during the later odd OFDM symbols), possibly after some delay for decoding the metadata so that it is possible to selectively enable pilot IQ capture. The client constructs its feature vector from the frequency domain averaged pilots later in the even OFDM symbols.

Inter-Packet Parallel

Figure 9:
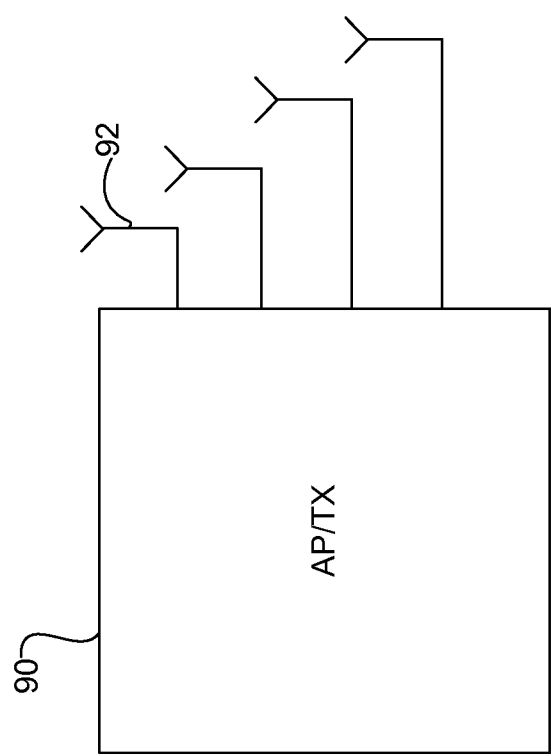
FIG. 9 is a block diagram of a transmitter for transmitting signals from an access point for use in location sensing at a mobile device, in accordance with another embodiment.

FIG. 9 illustrates a transmitter 90 for use in an inter-PPDU parallel method for the southbound interface. Typically, in a single TXOP (transmission opportunity), the AP broadcasts a location-burst announcement packet containing metadata (described above), followed by a sequence of short 1SS PPDUs (e.g., clear to send (CTS) sent to oneself (CTS2self)) in a row each sent via a different antenna 92. The client receives each and uses the subcarrier phase differences measured during each preamble to construct a feature vector. In this embodiment, the client 12 has at least two antennas.

Intra+Inter-Packet Switched+Parallel

It is also possible to perform an intra+inter-PPDU switched+parallel method for the southbound interface. For better performance, the first antenna in each PPDU is the same antenna, so later antennas in the same PPDU can be referenced to that antenna.

Broadcast Null Data Packet Announcement/Null Data Packet

In the following example, broadcast Null Data Packet Announcement (NDPA)/Null Data Packet (NDP) is defined as an exchange receivable by any client and not requiring a sounding response from any client. An AP with Ntx transmit antennas and Ntc transmit chains sends a NDPA and then sends a NDP out of all Ntx antennas with a suitable number of long training symbols (e.g., Ntc=1=>Nltf=1; Ntc=2=>Nltf=2; Ntc=3=>Nltf=4; Ntc=4=>Nltf=4, etc.). Since it is an NDP, a client, even with just one antenna can measure the CSI (channel state information) from all Ntx antennas, estimate phases, and the like.

The AP continues to send a sequence of NDPA+NDPs. Each subsequent NDP is sent with one common antenna from the first NDP and Ntc-1 new antennas. Thus, the client can measure phase of the Ntc-1 currently connected antennas with respect to the phase of the first (common) antenna.

The first NDP allows clients to sound Ntx antennas (e.g., 1-8). The subsequent NDPs keep one antenna from the first NDP and Ntx-1 new antennas. This allows phase differences across antennas to be measured reliably towards AoA location. This process is repeated until all antennas are covered. For example, for Ntx=16, Ntc=4, the client gathers phase information over a series of five NDPA+NDPs (i.e., 4+3+3+3+3). In one embodiment, each NDPA/NDP may be sent as a different TXOP with an antenna switch in the middle.

In one example a VHT NDPA is broadcast containing a special AID (association identifier) indicating 'for all STAs' (e.g., AID=0). The sequence of NDPA+NDPs is sent with a common antenna and without soliciting sounding from any stations. The client uses this information to construct a phase array of differential angles for AoA location.

In one example Ntx may be equal to Ntc.

Ap Interface

As discussed above, the baseband may need to control one or more N-way RF switches and antenna elements in one or more embodiments. In order to concentrate the location value in an external module, a Serial Peripheral Interface (SPI) or similar interface may be used from the baseband chip to an antenna+RF switch module. The SPI commands are typically received by a Simple Processing Entity (SPE) that directly controls the RF switches. In a preferred embodiment, each SPI command maps 1:1 with an antenna switch (i.e., one command every two OFDM symbols) so that timing can be precisely controlled. The SPE may be implemented by existing SPI General Purpose I/O (GPIO) chips, which can directly control RF switches.

In another embodiment, the SPI commands may be a single trigger (e.g., "OFDM symbols start now" then later "PPDU has ended") with the scheduling taking place within the SPE (e.g., "cycle after 2 µs then every 7.2 or 8 µs thereafter").

Daisy Chain Access Point

Figure 10:
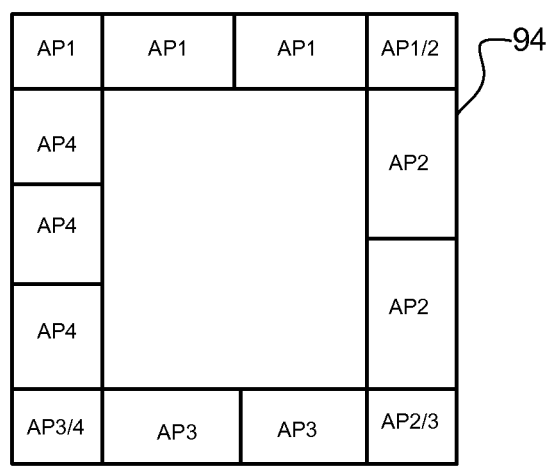
FIG. 10 is a diagram illustrating an example of an access point array for use in location sensing, in accordance with one embodiment.

FIG. 10 illustrates an AP arrangement (referred to as a daisy chain implementation) that may be used for one or more of the above-described embodiments. In the example shown in FIG. 10, four APs (AP1, AP2, AP3, AP4) are arranged along the edge of a device. Each AP includes a plurality of antenna 94. One antenna from each AP is wired into an adjacent AP, as indicated at 96 in FIG. 11. In this embodiment, at least one antenna from each of the access points is coupled with one of the antennas from another access point so that all of the access points are connected. The daisy chaining enables a location server (i.e., network device aggregating all of the AoA or phase data across all of the APs) to create a synchronization AoA estimation across several APs by using the shared antenna ports as a reference for the over-the-air phase. The angle of the CSI (channel state information) measured at AP1 should be the same as that measured at AP2 for the ports with the shared antenna.

For two daisy chained APs, the shared antenna creates a reference path on each AP so that phase differences due to the unsynchronized local oscillators (LOs) and packet acquisition between the two APs can be canceled out of the CSI angle estimation. By daisy chaining multiple APs, as shown in FIG. 11, this can be done across numerous APs.

Figure 11:
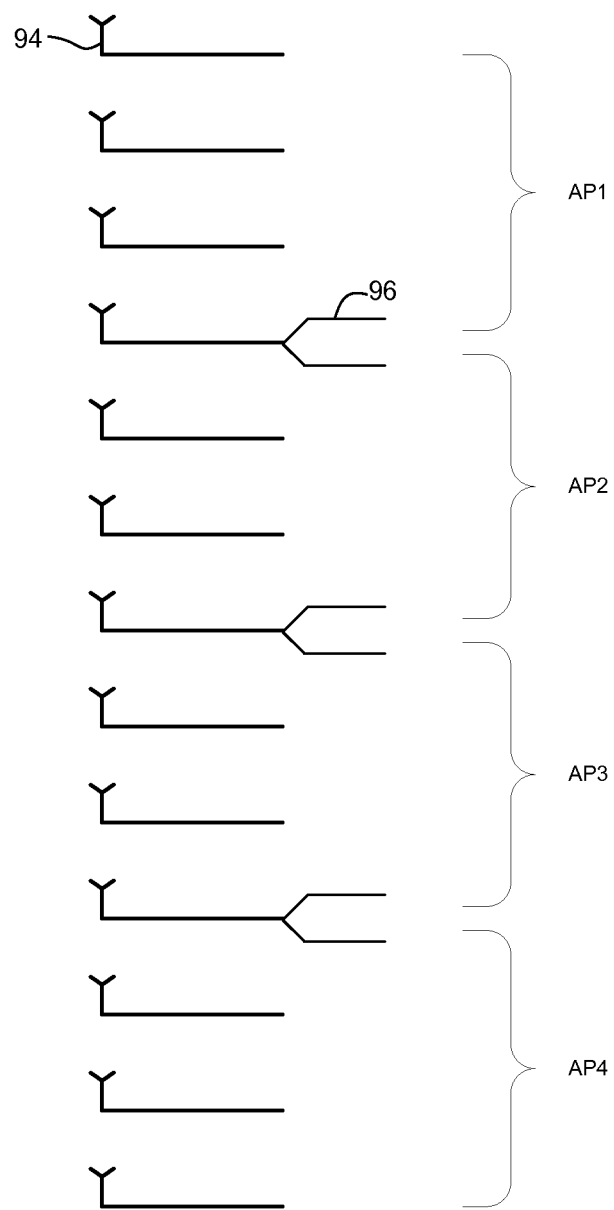
FIG. 11 is a diagram illustrating wiring between the access points in FIG. 10, in accordance with one embodiment.

It is to be understood that the arrangement shown in FIGS. 10 and 11 is only an example and that other configurations may be used without departing from the scope of the embodiments. For example, the APs may be arranged along a wall, adjacent to one another.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. An apparatus comprising:
a plurality of antennas comprising at least one antenna used for communications and at least two other antennas used for location sensing;
a receiver in communication with said plurality of antennas for receiving one or more packets in a block based modulation environment;
a switch interposed between the receiver and said at least two antennas used for location sensing for switching between said antennas, wherein the switch is not interposed between said at least one antenna used for communications and the receiver; and
a processor for calculating angle of arrival for use in identifying a location of a mobile device transmitting said one or more packets;
wherein the apparatus is configured so that communications and location sensing occur on the same packet.

2. The apparatus of claim 1 wherein the block based modulation environment comprises an Orthogonal Frequency Division Multiplexing system.

3. The apparatus of claim 1 wherein the block based modulation environment comprises a Wi-Fi network.

4. The apparatus of claim 1 wherein the apparatus comprises an access point comprising a two-dimensional or three-dimensional antenna array.

5. The apparatus of claim 1 wherein the packet comprises a Physical Layer Convergence Protocol (PLCP) Protocol Data Unit (PPDU).

6. The apparatus of claim 1 wherein the switch is configured to switch antennas on every other data symbol in the packet.

7. The apparatus of claim 1 wherein the switch is configured to switch antennas during a cyclic extension in the packet.

8. The apparatus of claim 1 wherein the switch is configured to switch antennas between said packets.

9. The apparatus of claim 1 wherein the processor is configured to average pilot subcarriers across a frequency domain.

10. The apparatus of claim 1 wherein the processor is configured for pairwise multiplying a value from one of the antennas used for communications with a complex conjugated version of the value from one of the antennas used for location sensing.

11. The apparatus of claim 1 wherein the switch is configured to switch the antennas within and between said packets to measure phases across multiple packets.

12. The method of claim 1 wherein said at least one antenna used for communications comprises a dipole array and said at least two other antennas used for location sensing comprise a conformal array.

13. An apparatus for mounting in a building, the apparatus comprising:
a first access point comprising a plurality of antennas;
one or more other access points each comprising a plurality of antennas; and
a plurality of shared antenna ports;
wherein each of the access points is located at the apparatus and at least one antenna from each of the access points is wired into one of the antennas from another of the access points such that all of the access points are connected to enable a synchronization angle of arrival estimation across the access points by using the shared antenna ports as a reference for an over-the-air phase for use in location sensing.

14. A method comprising:
receiving one or more packets in a block based modulation environment at a receiver in communication with a plurality of antennas comprising at least one antenna used for communications and at least two other antennas used for location sensing;
switching between said antennas at a switch interposed between the receiver and said at least two antennas used for location sensing, wherein the switch is not interposed between said at least one antenna used for communications and the receiver; and
calculating at a processor, angle of arrival for use in identifying a location of a mobile device transmitting said one or more packets;
wherein communications and location sensing occur on the same packet.

15. The method of claim 14 wherein the block based modulation environment comprises an Orthogonal Frequency Division Multiplexing system.

16. The method of claim 14 wherein the block based modulation environment comprises a Wi-Fi network.

17. The method of claim 14 wherein the packet comprises a Physical Layer Convergence Protocol (PLCP) Protocol Data Unit (PPDU).

18. The method of claim 14 wherein the switch is configured to switch antennas on every other data symbol in the packet.

19. The method of claim 14 wherein the switch is configured to switch antennas during a cyclic extension in the packet.

20. The method of claim 14 wherein the switch is configured to switch antennas between said packets.

* * * * *